United States Patent [19]
Huzinec et al.

[11] Patent Number: 5,912,030
[45] Date of Patent: Jun. 15, 1999

[54] COMESTIBLE PRODUCTS HAVING EXTENDED RELEASE OF ADDITITIVES AND METHOD OF MAKING

[75] Inventors: Robert J. Huzinec, Carol Stream; Thomas R. Kearns, Buffalo Grove; Terry L. Schindeldecker, Gurnee, all of Ill.

[73] Assignee: Leaf Inc., Lake Forest, Ill.

[21] Appl. No.: 08/923,318

[22] Filed: Sep. 4, 1997

Related U.S. Application Data

[63] Continuation of application No. 08/543,422, Oct. 16, 1995, abandoned.

[51] Int. Cl.$^6$ .................. A23G 3/30; A23G 9/00; A23L 2/00
[52] U.S. Cl. ................. 426/3; 426/96; 426/565; 426/590
[58] Field of Search ................. 426/3, 4, 5, 6, 426/96, 565, 590

[56] References Cited

U.S. PATENT DOCUMENTS

| | | | |
|---|---|---|---|
| 3,023,104 | 2/1962 | Battista et al. | |
| 3,795,744 | 3/1974 | Ogawa et al. | 426/3 |
| 3,818,107 | 6/1974 | Yolles | 426/3 |
| 3,826,847 | 7/1974 | Ogawa et al. | 426/3 |
| 3,857,964 | 12/1974 | Yolles | 426/3 |
| 3,897,566 | 7/1975 | Bahoshy et al. | 426/3 |
| 3,943,258 | 3/1976 | Bahoshy et al. | 426/3 |
| 3,982,023 | 9/1976 | Bahoshy et al. | 426/3 |
| 3,985,298 | 10/1976 | Nichols | 426/3 |
| 3,987,212 | 10/1976 | Seeley et al. | 426/614 |
| 4,001,438 | 1/1977 | Marmo et al. | 426/3 |
| 4,036,992 | 7/1977 | Bahoshy et al. | 426/3 |
| 4,045,581 | 8/1977 | Mackay et al. | 426/3 |
| 4,064,274 | 12/1977 | Mackay et al. | 426/3 |
| 4,065,579 | 12/1977 | Mackay et al. | 426/3 |
| 4,085,227 | 4/1978 | Mackay et al. | 426/3 |
| 4,087,557 | 5/1978 | Bakal et al. | 426/3 |
| 4,157,401 | 6/1979 | Stroz et al. | 426/3 |
| 4,200,663 | 4/1980 | Seeley et al. | 426/614 |
| 4,206,301 | 6/1980 | Yolles | 536/3 |
| 4,217,368 | 8/1980 | Witzel et al. | 426/5 |
| 4,241,091 | 12/1980 | Stroz et al. | 426/4 |
| 4,248,894 | 2/1981 | Mackay et al. | 426/3 |
| 4,252,830 | 2/1981 | Kehoe et al. | 426/5 |
| 4,271,199 | 6/1981 | Cherukuri et al. | 426/5 |
| 4,311,720 | 1/1982 | Marmo et al. | 426/594 |
| 4,357,354 | 11/1982 | Kehoe et al. | 426/3 |
| 4,384,004 | 5/1983 | Cea et al. | 426/3 |
| 4,389,425 | 6/1983 | Burr, II | 426/598 |
| 4,475,919 | 10/1984 | Woznicki et al. | 426/540 |
| 4,485,118 | 11/1984 | Carroll et al. | 426/5 |
| 4,590,075 | 5/1986 | Wei et al. | 426/5 |
| 4,597,970 | 7/1986 | Sharma et al. | 426/5 |
| 4,609,561 | 9/1986 | Wade et al. | 426/565 |
| 4,626,441 | 12/1986 | Wolkstein | 426/548 |
| 4,634,593 | 1/1987 | Stroz et al. | 426/5 |
| 4,680,189 | 7/1987 | Schumacher et al. | 426/285 |
| 4,710,390 | 12/1987 | Schumacher et al. | 426/285 |
| 4,724,151 | 2/1988 | Mansukhani et al. | 426/3 |
| 4,728,526 | 3/1988 | Avera | 426/633 |
| 4,775,537 | 10/1988 | Calabro et al. | 426/3 |
| 4,800,091 | 1/1989 | Glass et al. | 426/3 |
| 4,803,082 | 2/1989 | Cherukuri et al. | 424/493 |
| 4,816,265 | 3/1989 | Cherukuri et al. | 426/5 |
| 4,816,283 | 3/1989 | Wade et al. | 426/565 |
| 4,824,681 | 4/1989 | Schobel et al. | 426/5 |
| 4,832,977 | 5/1989 | Avera | 426/633 |
| 4,857,352 | 8/1989 | Miller et al. | 426/548 |
| 4,911,934 | 3/1990 | Yang et al. | 426/5 |
| 4,915,958 | 4/1990 | Faust et al. | 426/3 |
| 4,919,941 | 4/1990 | Zibell | 426/5 |
| 4,927,654 | 5/1990 | Barnett et al. | 426/548 |
| 4,933,190 | 6/1990 | Cherukuri et al. | 426/5 |
| 4,935,258 | 6/1990 | Wade et al. | 426/565 |
| 4,942,055 | 7/1990 | Avera | 426/633 |
| 4,959,225 | 9/1990 | Wong et al. | 426/3 |
| 4,959,240 | 9/1990 | Aulik et al. | 426/637 |
| 4,978,541 | 12/1990 | Stypula et al. | 426/92 |
| 4,981,698 | 1/1991 | Cherukuri et al. | 426/5 |
| 4,983,404 | 1/1991 | Raman et al. | 426/3 |
| 4,983,405 | 1/1991 | Cherukuri et al. | 426/3 |
| 4,986,991 | 1/1991 | Yatka et al. | 426/3 |
| 4,992,280 | 2/1991 | Yung Chu et al. | 426/5 |
| 4,997,659 | 3/1991 | Yatka et al. | 426/3 |
| 4,997,667 | 3/1991 | Nofre et al. | 426/3 X |
| 5,030,459 | 7/1991 | Barcelon et al. | 426/3 |
| 5,043,169 | 8/1991 | Cherukuri et al. | 426/5 |
| 5,057,327 | 10/1991 | Yatka et al. | 426/3 |
| 5,057,329 | 10/1991 | Stypula et al. | 426/92 |
| 5,061,507 | 10/1991 | Aulik et al. | 426/637 |
| 5,077,075 | 12/1991 | Wade | 426/564 |
| 5,093,145 | 3/1992 | Darbonne et al. | 426/615 |
| 5,100,678 | 3/1992 | Reed et al. | 426/3 |
| 5,108,762 | 4/1992 | Broderick et al. | 426/5 |
| 5,110,608 | 5/1992 | Cherukuri et al. | 426/3 |
| 5,116,627 | 5/1992 | Rutherford et al. | 426/5 |
| 5,133,977 | 7/1992 | Patel | 426/3 |
| 5,139,787 | 8/1992 | Broderick et al. | 424/486 |
| 5,139,793 | 8/1992 | Johnson et al. | 426/3 |
| 5,139,797 | 8/1992 | Huzinec et al. | 426/3 |

(List continued on next page.)

FOREIGN PATENT DOCUMENTS

| | | |
|---|---|---|
| WO90/07859 | 7/1990 | WIPO. |
| WO90/13994 | 11/1990 | WIPO. |
| WO90/14107 | 11/1990 | WIPO. |
| WO93/08699 | 5/1993 | WIPO. |

*Primary Examiner*—Arthur L. Corbin
*Attorney, Agent, or Firm*—Arnold White & Durkee

[57] ABSTRACT

The present invention provides a comestible product having extended release of additives wherein the additives are mixed with a carrier containing from about 10 wt. % to about 100 wt. % of a microcrystalline material, the microcrystalline material having a particle size ranging from about 0.1 $\mu$m to about 100 $\mu$m. Additives which may be mixed with the microcrystalline carrier are flavors, sweeteners, vitamins, pharmaceuticals, minerals, colors, acids, and mixtures thereof. Examples of carriers are microcrystalline cellulose, zeolites, carbon black, and mixtures thereof. Examples of comestible products in which the additive/carrier blend may be used are chewing gum, bubble gum, instant beverages, and frozen desserts.

71 Claims, No Drawings

U.S. PATENT DOCUMENTS

| | | | |
|---|---|---|---|
| 5,139,798 | 8/1992 | Yatka et al. | 426/5 |
| 5,153,011 | 10/1992 | Patel et al. | 426/5 |
| 5,156,865 | 10/1992 | Gudas et al. | 426/3 |
| 5,156,866 | 10/1992 | Sato et al. | 426/5 |
| 5,158,790 | 10/1992 | Witkewitz et al. | 426/3 |
| 5,169,658 | 12/1992 | Yatka et al. | 426/5 |
| 5,217,735 | 6/1993 | Zibell | 426/3 |
| 5,227,182 | 7/1993 | Song et al. | 426/5 |
| 5,236,721 | 8/1993 | Yung Chu et al. | 426/5 |
| 5,338,809 | 8/1994 | Bell et al. | 426/5 |
| 5,360,618 | 11/1994 | Walker | 426/72 |
| 5,370,881 | 12/1994 | Fuisz | 426/5 |
| 5,389,395 | 2/1995 | Joseph et al. | 426/72 |
| 5,397,588 | 3/1995 | Antenucci et al. | 426/573 |

5,912,030

COMESTIBLE PRODUCTS HAVING EXTENDED RELEASE OF ADDITITIVES AND METHOD OF MAKING

This application is a continuation of application Ser. No. 08/543,422 Filed Oct. 16, 1995, now abandoned.

FIELD OF THE INVENTION

The present invention relates to the extended release of additives in comestible products as well as to methods of extending the release of additives in comestible products. In one aspect, the invention relates to the extended release of flavor and sweetness in chewing or bubble gum.

BACKGROUND OF THE INVENTION

Additives in comestible products tend to be released after having been chewed for a short period of time. For example, the perception of the presence of additives in typical chewing and bubble gum such as flavor or sweeteners tends to diminish substantially after about 7–15 minutes of chewing and is virtually nonexistent after 20–25 minutes.

Extension of sweetness and flavor in chewing or bubble gums has been done by various methods. Sweeteners have been extended by, for example, using high levels of high intensity sweeteners such as aspartame, dispersing sweeteners in hydrophobic matrices, and encapsulating sweeteners, e.g., by mixing them with polyvinyl acetate. Extension of flavors in chewing or bubble gum has been done by methods such as preparing an emulsion of flavorant with a hydrophilic matrix and drying and grinding the emulsion, and by encapsulation of the flavorant and/or sweetener in an elastomeric matrix, polymeric medium, gelatin, wax, hydroxypropylmethylcellulose, polyethylene, fats, starches, sugars, zein, and gums such as gum arabic, xanthan, locust bean.

Encapsulation of additives such as flavors and sweeteners is time-consuming and expensive. In addition, the encapsulation process and parameters can change the character of the flavor (certain peaks present in the gas chromatographic spectrum of the flavor can be lost upon encapsulation) and some techniques of encapsulation can preclude the release of flavor in the final product. Further, encapsulation techniques can be used to prevent or retard the release of the additives, e.g., during the manufacturing process to prevent additive loss due to volatilization.

There is a need in the industry for products having extended release of additives and methods for extending the release of additives which are effective as well as economical. Further, there is a desire to extend the shelf-life of products such as chewing or bubble gum. Flavors in chewing or bubble gum are volatile and often intermingle with other components of the chewing or bubble gum. It is desirable that the flavor be maintained during storage despite exposure to changes in the temperature and humidity.

SUMMARY OF THE INVENTION

It has been discovered that the release of certain additives in chewing or bubble gum and other comestible products may be extended by mixing them with a carrier to form an additive/carrier blend, and subsequently mixing the additive/carrier blend with the other components of the comestible product.

The carrier comprises a microcrystalline material having a particle size ranging from about 0.1 $\mu$m to about 100 $\mu$m, preferably from about 0.1 $\mu$m to about 15 $\mu$m, most preferably from about 0.1 $\mu$m to about 2 $\mu$m. The carrier is composed of from about 10 wt. % to about 100 wt. % microcrystalline material, preferably about 20 wt. % to about 100 wt. %, most preferably about 60 wt. % to about 90 wt. %. The carrier is preferably capable of absorbing both hydrophilic and hydrophobic materials at a level of at least 35% of its weight of an oil- or water-based solution.

Another beneficial property of the carrier is the ability to incorporate into the carrier, by absorption and/or adsorption, the additives and segregate them from one another, thereby allowing additive/carrier blends containing more than one additive to release each additive at the same or at different times. The carriers may contain materials that aid in providing desirable properties, e.g., dispersants, such as carboxy-methylcellulose, whey, xanthan, maltodextrin, guar gum, gum arabic, starches, and locust bean gum. Examples of carriers are microcrystalline cellulose, zeolites, aluminum silicates, carbon black, and mixtures thereof. The microcrystalline cellulose may be used in a powdered or a colloidal form.

The additive/carrier blend is prepared by mixing the carrier with a liquid which comprises the additive and, optionally, other components such as a solvent or other aids such as dispersants. Examples of solvents which may be used with the additive of the present invention are water, flavors, alcohols, food grade organic solvents, and other solvents known in the art as dissolving the particular additive being used. The additive/carrier blend preferably has the consistency of a paste. One method for preparing the paste is to mix the carrier with enough of the liquid comprising the additive to the point where there is very little, if any, free liquid.

Examples of additives that may be mixed with the carrier and added to the comestible products of the present invention are flavors, flavor enhancers, flavor masking additives, sweeteners, sweetener enhancers, vitamins, pharmaceuticals, minerals, colors (natural and artificial, preferably water-soluble), acids, and mixtures thereof. Additives should not be compounds which are solvents for the microcrystalline material and are preferably compounds which are able to be incorporated into the carrier. The additive/carrier blend of the present invention can be used with comestible products which are liquid, solid, or semi-solid, e.g., chewing gum, bubble gum, instant beverages, and frozen desserts. The comestible products are preferably chewable products such as chewing gum and bubble gum.

Where the additive is a flavor in a chewing or bubble gum, the additive/carrier blend is prepared by mixing a liquid comprising the flavor and, optionally, a solvent with the carrier. The flavor/carrier blend will contain from about 5 wt. % to about 95 wt. % of the liquid comprising the flavor, preferably from about 15 wt. % to about 60 wt. %, more preferably from about 25 wt. % to about 50 wt. %, and most preferably from about 30 wt. % to about 40 wt. %. The liquid comprising the flavor may also include other components such as dispersants, solvents, or modifiers. Where the additive is a sweetener used in chewing or bubble gum, the additive/carrier blend is prepared by mixing a liquid comprising the sweetener and, optionally, a solvent with the carrier. The sweetener/carrier blend will contain from about 1 wt. % to about 99 wt. % of the liquid comprising the sweetener, preferably from about 5 wt. % to about 95 wt. %, more preferably from about 20 wt. % to about 90 wt. %, and most preferably from about 40 wt. % to about 80 wt. %. The liquid comprising the sweetener may also include other components such as a solvent.

The additive/carrier blend of the present invention causes the additives to be released in a well-balanced manner over an extended time period, for better consumer acceptability.

DETAILED DESCRIPTION OF THE INVENTION

The present invention provides a comestible product and process which allows for extended release of additives such as flavor and sweetness which may be provided at a reasonable cost. The extended release of additives is provided upon chewing the comestible product. In some comestible products, this release may also be provided in the digestive tract after swallowing. The extended time of release is seen in comparing a typical chewing gum with a chewing gum of the present invention. The typical chewing gum permanently traps 60–75% of the free oil soluble, liquid flavor in the gum base. The remaining free flavor, which is physically attached to soluble bulk sweeteners, is released rather quickly and a person chewing the gum perceives a loss of flavor after a short period of time (e.g., 10 minutes). By contrast, a person chewing the gum of the present invention does not perceive the loss of flavor (or sweetener or other additives) until a time period which ranges from about 20 minutes to over an hour. It is believed that the mechanism of the release is the continuous displacement of the additives by saliva during and as a result of mastication, such displacement causing the release of the additives to the oral cavity taste receptors.

A benefit to a chewing or bubble gum made with the additive/carrier blend of the present invention is that a person chewing the gum can perceive the presence of the additive at a consumer-acceptable level over a period of at least 25 minutes. Other benefits are that extension of the release of the additive prolongs salivation stimulation and that the additive/carrier blend allows the maintenance of a consistent texture, specifically a smooth and soft texture, in the gum as opposed to the tough and rubbery texture that some commercially-available gum has after it has been chewed.

The additive/carrier blend of the present invention may be used in conjunction with additives which are not mixed with carrier, e.g., "free" additives or encapsulated additives, to provide sequential release of additives. For example, where the comestible product is a chewing gum and the additives are the flavors: free peppermint, encapsulated spearmint, and a menthol/carrier blend, the free peppermint flavor will be released first, followed by the encapsulated spearmint flavor, and finally, the menthol flavor.

The additive/carrier blend compositions of the present invention may be prepared by mixing the carrier with one or more additives to form an additive/carrier blend having the desired additive/carrier weight ratio. The additive/carrier blend is subsequently mixed with other components to form the comestible product. Where the comestible product is chewing or bubble gum, the additive/carrier blend is mixed with the gum matrix, the coating over the gum matrix, and/or other chewing or bubble gum components.

The additives which may be mixed with the carrier include flavors, flavor enhancers, flavor masking additives, sweeteners, and sweetener enhancers. Flavors which may mixed with the carrier of the present invention are natural or artificial flavors. Examples are essential oils, such as cinnamon, spearmint, peppermint, birch, and anise; fruit flavors, both natural flavors derived from the essence of fruits and artificial fruit flavors, e.g., apple, pear, peach, strawberry, cherry, apricot, orange, watermelon, banana, and bubble gum flavor; bean-derived flavors, such as coffee and cocoa; wine-derived flavors, such as curacao zin; and pungent materials, such as affini, pepper, and mustard, and mixtures thereof. The flavor enhancers, flavor masking additives, and sweetener enhancers which may be used are those known in the art. The flavors may be present on the carrier alone or in mixture with each other, depending upon the product it is desired to prepare. Flavors are generally mixed with a dispersant which comprises approximately 40–80 wt. % of the flavor mixture in order to dilute the flavor, to obtain a homogeneous mix of flavor, and to control the cost of the flavoring agent. Examples of dispersants which may be used are propylene glycol, heavy fat, vegetable oils, and other organic solvents.

Sweeteners which may be mixed with the carrier of the present invention are natural and artificial sweeteners. Examples are sugars or polyols in dry or liquid form, such as sucrose, fructose, dextrose, lactose, corn syrup, molasses, maltitol, maltitol syrup, sorbitol, mannitol, xylitol, lactitol, cyclodextrins, and D-tagatose, and intense sweeteners such as acesulfame potassium ("Ace-K"), L-aspartyl-L-phenylalanine methyl ester (aspartame), talin, sucralose, alitame, monoammoniated glycerizinate (MAG), saccharin cyclamates, and mixtures thereof. The sweeteners used in chewing or bubble gum are at least slightly soluble in water.

A comestible product may contain both additives mixed with a carrier as well as additives present in an free and/or encapsulated form. Where the additives are sweeteners or flavors in chewing or bubble gum, the amount of the liquid comprising the additive which is mixed with a carrier will vary based upon the solvent being used and the concentration of the additive in the solvent. The total amount of flavor and sweetener which will be present in chewing or bubble gum will vary from product to product and from country to country, based on product design and consumer preferences. The amount of flavor to be mixed with the carrier in the chewing or bubble gum of the present invention (in contrast to the amounts of flavor or sweetener which are added in another form, e.g., free or encapsulated forms) are from about 0.1 wt. % to about 5 wt. % flavor, preferably from about 0.1 wt. % to about 3 wt. %, most preferably from about 0.1 wt. % to about 1 wt. % based upon the weight of the final chewing or bubble gum product. The amount of intense sweetener (undiluted) to be mixed with the carrier may be from about 0.005 wt. % to about 1 wt. %, preferably from about 0.02 wt. % to about 0.2 wt. %, most preferably from about 0.05 wt. % to about 0.12 wt.% based upon the weight of the final chewing or bubble gum product. The amount of bulk sweetener to be mixed with the carrier may be from about 1 wt. % to about 40 wt. %, preferably from about 20 wt. % to about 35 wt. %, most preferably from about 25 wt. % to about 30 wt. % based upon the weight of the final chewing or bubble gum product.

The comestible product of the present invention is preferably a gum, either chewing or bubble gum. The gum of the present invention comprises gum base, flavor/carrier blend and/or sweetener/carrier blend, and, optionally, additional flavor and additional sweetener which is not mixed with carrier, e.g., flavor or sweetener in free or encapsulated form. A person chewing gum containing the typical flavor extender will experience an intense short-term release of flavor and/or sweetness after approximately 10 minutes. When the flavors or sweeteners are mixed with the carriers of the present invention, the release of the flavor is extended over a substantially longer time period rather than being expended in a comparatively short-term, intense, release of flavor.

In general, the chewing or bubble gum compositions containing the flavor/carrier blend and/or sweetener/carrier blend of the present invention comprise the following components, but are subject to change in view of consumer acceptability and changing consumer preferences:

| | Weight Percent of Gum | |
|---|---|---|
| Component | General | Preferred |
| Gum Base | 15–35 | 20–30 |
| Flavor | | |
| to be mixed with carrier | 0.1–5 | 0.1–1 |
| not mixed with carrier prior to mixing with gum base | 0.5–5 | 1–3 |
| Intense Sweetener | | |
| to be mixed with carrier | 0.005–1 | 0.05–0.12 |
| not mixed with carrier prior to mixing with gum base | 0.02–1 | 0.03–0.5 |
| Bulk Sweeteners | | |
| to be mixed with carrier | 1–40 | 25–30 |
| not mixed with carrier prior to mixing with gum base | 50–75 | 60–70 |
| Softeners | 0–30 | 2–20 |

The gum bases useful in the present invention, include those gum bases utilized for chewing gums or bubble gums. Both chewing and bubble gum bases employ a number of elastomeric materials as part thereof. Examples of these elastomeric materials are synthetic gums or elastomers such as butadiene-styrene copolymers, polyisobutylene and isobutylene-isoprene copolymers; natural gums or elastomers such as chicle, natural rubber Jelutong, balata, guttapercha, lechi caspi, sorva, guttakay, crown gum, perillo, and mixtures thereof. In addition, a non-toxic vinyl polymer, such as polyvinyl acetate and its partial hydrolyzate, polyvinyl alcohol, and mixtures thereof, may be used. The vinyl acetate polymer may possess a molecular weight ranging from about 2,000 to about 94,000. Among these, butadiene-styrene copolymer, polyisobutylene, isobutyleneisoprene copolymer or mixtures, are frequently used.

The gum base usually includes an elastomer solvent, which may be selected from terpene resins, such as polymers of α-pinene or β-pinene; rosin derivatives including hydrogenated or partially hydrogenated derivatives, such as the glycerol ester of polymerized rosin, alcohol esters of rosin, such as the glycerol ester of hydrogenated rosin, the pentaerythritol ester of hydrogenated rosin, the pentaerythritol ester of hydrogenated rosin, the pentaerythritol ester of partially hydrogenated rosin, the glyceryl esters of partially hydrogenated rosin, the glyceryl ester of rosin, and mixtures thereof.

The base may include softeners, plasticizers, and/or emulsifiers such as hydrogenated vegetable oil, cocoa butter, and natural waxes, petroleum waxes such as the polyethylene waxes and paraffin waxes, microcrystalline waxes with melting points higher than 80° C., and mixtures thereof. Fatty acids may also be used as softeners, and suitable fatty acids include stearic acid, palmitic acid, oleic acid, and mixtures thereof. Corn syrup, sugar alcohols such as sorbitol, mannitol and xylitol as well as hydrolyzed cereal solids may be used as softeners. The gum bases also frequently include emulsifiers, particularly those that would be compatible with the vinyl polymer, if included in the base. Particularly, lanolin, lecithin, glyceryl monostearate, fatty acid monoglycerides, diglycerides and triglycerides, glycerol triacetate, propylene glycol, propylene glycol monostearate and mixtures thereof may be used.

The gum base may also contain thickeners, that may be employed alone or in conjunction with other softeners. The thickeners may include methyl cellulose, alginates, carrageenan, xanthan gum, gelatin, carob, tragacanth, locust bean gum, and carboxy methyl cellulose.

The gum base may include fillers and texturing agents. Examples are mineral adjuvants such as calcium carbonate, magnesium carbonate, alumina, aluminum hydroxide, aluminum silicate, talc, tricalcium phosphate, and mixtures thereof.

The gum base may also include conventional components such as antioxidants, preservatives, and colorants. For example, titanium dioxide may be utilized as a colorant, and antioxidants such as butylated hydroxytoluene, butylated hydroxyanisole, propyl gallate, and mixtures thereof, may also be included.

Gum bases may be prepared for a variety of products, including conventional gums and bubble gums, and this invention is not limited to a specific gum base formulation. The above description is therefore presented for purposes of illustration only.

While various bulking agents can be used in the gum compositions, the sugar alcohols are of particular value for both sugar-containing and sugarless compositions, since they also impart sweetness to the gum composition. Sugar alcohols useful in the preparation of the present gum compositions include mannitol, sorbitol, xylitol, lactitol, maltitol, etc., and mixtures thereof.

It should be understood that embodiments of the present invention have been described as merely illustrative of a few of the applications of the principles of the present invention. Numerous modifications may be made by those skilled in the art without departing from the true spirit and scope of the invention.

EXAMPLES

The following examples illustrate the preparation of chewing or bubble gum compositions using the additives of the present invention. The compositions were prepared using the following methods:

Sugar-containing Gum Formula

The sugar-containing gum formulas were prepared by first adding gum base to a jacketed sigma blade mixer. If rework (scraps of gum base from manufacturing e.g., due to trimming, breakage of pieces, badly-shaped pieces) was available it was added to the gum base and mixed until homogeneous. If no rework was available, this mixing step was omitted. Corn syrup (added as both a softener and a liquid sweeteners) and other softeners were added to the gum base and mixed until homogenous; one or more dry sugars (e.g., sucrose, fructose, glucose, dextrose) were added to previous gum base mixture sequentially and mixed until homogenous; liquid flavor was added to the previous mixture and mixed for 1–2 minutes; encapsulated and/or free high intensity sweeteners were added to the previous mixture mixed for 1 minute; flavor/carrier blend and sweetener/carrier blend were then added and mixed for 1 minute to produce the gum. The gum was then removed from the mixer and formed into the desired format (either chunk, stick, pellet, tab, or ball).

The carrier used was colloidal Avicel® (a product of FMC Corporation), which had a particle size in the range of from about 0.1 μm to about 2 μm. In particular, Avicel RC-591F was used; Avicel RC-591F is 88% microcrystalline cellulose and also comprises a hydrophilic barrier dispersant, sodium carboxymethylcellulose; Avicel RC-591F is 70% colloidal (i.e., 70% of the particles are less that 0.2 μm in diameter). The Avicel microcrystalline cellulose is prepared (by FMC Corporation) by hydrolyzing (depolymerizing) alpha cellulose to remove the amorphous regions, leaving only the crystalline region which is composed of tight bundles of microcrystals in a rigid linear arrangement to produce a cellulose gel. The cellulose gel is then processed to produce either a powdered cellulose gel or a colloidal cellulose gel. Avicel RC-591F is the colloidal gel form. The use of powdered Avicel, which is 100% microcrystalline cellulose having a particle size in the range of from about 6 $\mu$m to about 100 $\mu$m, is also contemplated as a part of the present invention.

Sugarless Gum Formula:

The sugarless gum formula was prepared by adding gum base to a jacketed sigma blade mixer. If rework was available it was added to the gum base and mixed until homogeneous. If no rework was available, this mixing step was omitted. One or more dry polyols were then added and mixed until homogenous; liquid softeners and other liquid polyols were added to the previous mixture and mixed until homogenous; liquid flavor was added to the previous mixture and mixed 1–2 minutes; encapsulated and/or unencapsulated high intensity sweeteners were added to the previous mixture and mixed 1 minute; flavor/carrier blend and sweetener/carrier blend were then added to the previous mixture (the carrier was Avicel RC-591F) and mixed for 1 minute to produce the gum. The gum was then removed from the mixer and formed into the desired format (either chunk, stick, pellet, tab, or ball).

Additives Mixed with Carrier

To prepare a flavor or sweetener mixed with a carrier, the flavor or sweetener is added to the carrier with agitation until a consistent mixture is produced. All types of flavors and sweeteners can be utilized, both water soluble and organic soluble. Where Avicel is the carrier, the preferred flavor blend is the saturated blend of about 65 wt. % Avicel and about 35 wt. % liquid flavor and the preferred sweetener blend is the saturated blend of about 25 wt. % Avicel and about 75 wt. % of a liquid comprising a high intensity sweetener. These saturated blends had the consistency of a paste.

Example 1

An experiment was done to determine the amount of a sweetener (acesulfame potassium ("Ace-K")) which would saturate a carrier (Avicel RC-591F). Blends of a 20 wt. % Ace-K solution and Avicel containing from 5 wt. % to 95 wt. % carrier with the balance being the sweetener solution were prepared. It was determined that the carrier was saturated at a blend of 25 wt. % carrier and 75 wt. % sweetener solution.

Example 2

Sugarless gum formula batches A–D were prepared by mixing a saturated Ace-K paste prepared as in Example 1 (25 wt. % carrier and 75 wt. % sweetener solution) with the components listed in Table 1. The gum base itself did not contain any Avicel carrier.

The flavors used were as follows: Peppermint Flavor/carrier Blend A: 75% essential peppermint oil and 25% Avicel carrier; Peppermint Flavor/carrier Blend B: 35% essential peppermint oil and 65% Avicel carrier; Sweetener/carrier Blend: 25% Avicel and 75% of a 20 wt. % solution of Ace-K; Spray Dried Peppermint, and Liquid Peppermint Flavor.

TABLE 1

| Ingredients | Sample # (wt. % ingredient) | | | |
|---|---|---|---|---|
| | A | B | C | D |
| Neutral Chewing Gum Mass | 97.16 | 96.91 | 96.66 | 95.76 |
| Pep Flv/carrier Blend A | 2.10 | — | — | — |
| Pep Flv/carrier Blend B | — | 1.00 | 1.00 | 1.50 |
| Sweetener/carrier blend | — | — | 0.40 | 0.80 |
| Spray Dried Peppermint Flv | 0.45 | 0.45 | 0.45 | 0.45 |
| Ace-K Powder | 0.06 | 0.06 | 0.06 | 0.06 |
| Aspartame Powder | 0.08 | 0.08 | 0.08 | 0.08 |
| Encapsulated Ace-K | 0.15 | 0.15 | — | — |
| Peppermint Flv Blend | — | 1.35 | 1.35 | 1.35 |
| Liquid | | | | |
| TOTAL | 100.00 | 100.00 | 100.00 | 100.00 |

An experienced taste panel observed that the release of the flavor and sweetener was extended for all samples, with Sample D, having the saturated flavor and saturated sweetener blend, being preferred.

Example 3

A sugarless gum formula having free flavor, sweetener, and carrier into the gum base matrix. The carrier used was 5 wt. % Avicel microcrystalline cellulose. Experienced taste testers observed that the gum displayed intense short-term flavor release 10–12 minutes into the chew giving a more even perception of flavor on the entire course of chew than a gum which did not contain the carrier.

Example 4

A sugarless gum formula was produced with various ratios of flavor mixed with Avicel 591F. A neutral mass base was prepared with the ingredients listed in Table 2. This material mass was then used for the samples specified in Tables 3 and 4.

TABLE 2

| Ingredient | Wt % |
|---|---|
| Neutral Sugarless Chewing Gum Mass | 99.83 |
| Aspartame | 0.10 |
| Ace-K | 0.07 |
| TOTAL | 100.00 |

Flavor blends were prepared with spearmint flavor using Avicel RC-591F and having weight ratios as per Table 3. Sample E was the saturated Avicel paste.

TABLE 3

| Sample | Flavor, wt. % | Avicel, wt. % |
|---|---|---|
| A | 90 | 10 |
| B | 75 | 25 |
| C | 60 | 40 |

TABLE 3-continued

| Sample | Flavor, wt. % | Avicel, wt. % |
|--------|---------------|---------------|
| D | 50 | 50 |
| E | 35 | 65 |
| F | 25 | 75 |
| G | 10 | 90 |

Some gum samples were produced immediately after the flavor blends were made and others after the flavor blends were aged for two days. Each sample contained the same total amount of flavor as the control. The amounts of each component in the gum samples are listed in Table 4.

TABLE 4

| | Control | A | B | C | D | E | F | G |
|---|---------|---|---|---|---|---|---|---|
| Neutral Mass base: | 98.4 | 98.2 | 97.9 | 97.3 | 96.8 | 95.4 | 93.6 | 84 |
| Liq. Flavor: | 1.6 | — | — | — | — | — | — | — |
| Flavor Blend: | — | 1.8 | 2.1 | 2.7 | 3.2 | 4.6 | 6.4 | 16 |
| TOTAL | 100.0 | 100.0 | 100.0 | 100.0 | 100.0 | 100.0 | 100.0 | 100.0 |

An experienced taste panel observed that the release of the flavor was extended for all samples, fresh and aged, relative to the control, with Sample B exhibiting the best flavor extension and the best consumer-acceptable texture. The duration of flavor in the control was approximately 5–8 minutes, whereas the inventive samples exhibited flavor beyond 25 minutes. The panel observed that the extension of flavor was achieved as an consistent release rather than as a intense short-term release of flavor as experienced when chewing the gum of Example 2 where the flavor was not pre-mixed with the carrier.

Example 5

A sugarless gum prepared with a peppermint flavor blend having the flavor/Avicel concentration of Sample B in Example 4 (75% peppermint flavor and 25% Avicel). Peppermint flavor blend was prepared by mixing peppermint with Avicel and then curing by exposing the mixture to air at approximately 25°C. for approximately one (1) hour. The blend was then mixed with the gum matrix (prepared as in Table 5) and sweeteners other flavors at the proportions listed in Table 6. The product was then put into stick gum format. These neutral masses were then used for samples specified in Table 6.

TABLE 5

| Ingredient | A | B |
|------------|---|---|
| Neutral Sugarless Chewing Gum Mass I | 99.83 | — |
| Neutral Sugarless Chewing Gum Mass II | — | 99.83 |
| Aspartame | 0.10 | 0.10 |
| Ace-K | 0.07 | 0.07 |
| TOTAL | 100.00 | 100.00 |

TABLE 6

| | Control | 1 | 2 | 3 | 4 | 5 | 6 |
|---|---------|---|---|---|---|---|---|
| Neutral Mass | 98.40 | 97.90 | 97.40 | 97.75 | 97.25 | 97.90 | 97.75 |
| | (A) | (B) | | | | | |
| Peppermint Liquid Flavor | 1.60 | — | — | — | — | 1.60 | 1.60 |
| Peppermint/Carrier Blend | — | 2.10 | 2.10 | 2.10 | 2.10 | — | — |
| Spray Dried Peppermint | — | — | 0.50 | — | 0.50 | 0.50 | 0.50 |
| Encapsulated Ace-K | — | — | — | 0.15 | 0.15 | — | 0.15 |
| TOTAL | 100.00 | 100.00 | 100.00 | 100.00 | 100.00 | 100.00 | 100.00 |

All samples which contained flavor blends exhibited flavor extension relative to control. Curing of the flavor blend did not have a perceptible effect on flavor extension.

Example 6

A stick gum containing the flavor/carrier and sweetener/carrier blend was compared to Wrigley's "Extra" stick gum and to a stick gum prepared with an encapsulated flavor and sweetener. The comparison was done by having trained panelists chew the gum and rate it on a scale from 1–10 in various categories over a period of 20 minutes. Results below are the sum of the ratings of all panelists.

A peppermint-flavored chewing gum prepared as in Example 5 was compared to a chewing gum wherein the flavor was encapsulated. Results appear in Tables 7, 8, and 9.

TABLE 7

| | Peppermint/Carrier (Inventive) | | |
|---|---|---|---|
| | 2 Min | 10 Min | 20 Min |
| FLAVOR AMOUNT | 80 | 56.66 | 36.66 |
| FLAVOR LIKING | 80 | 61.66 | 46.66 |
| SWEETS AMOUNT | 76.66 | 45 | 23.33 |
| SWEET LIKING | 63.33 | 48.33 | 38.33 |
| COOLING SENSATION | 73.33 | 60 | 50 |
| COOLING LIKE | 75 | 56.66 | 50 |
| TEXTURE | 58.33 | 55 | 48.33 |
| TEXTURE LIKE | 71.66 | 76.66 | 73.33 |
| OVERALL LIKING | | | 70 |

TABLE 8

Wrigley's "Extra" Peppermint (Comparative)

|  | 2 Min | 10 Min | 20 Min |
|---|---|---|---|
| FLAVOR AMOUNT | 70 | 57.5 | 52.5 |
| FLAVOR LIKING | 70 | 60 | 50 |
| SWEETS AMOUNT | 60 | 37.5 | 27.5 |
| SWEET LIKING | 67.5 | 45 | 37.5 |
| COOLING SENSATION | 65 | 65 | 45 |
| COOLING LIKE | 65 | 65 | 40 |
| TEXTURE | 67.5 | 70 | 65 |
| TEXTURE LIKE | 75 | 75 | 70 |
| OVERALL LIKING |  |  | 57.5 |

TABLE 9

Encapsulated Peppermint (Comparative)

|  | 2 Min | 10 Min | 20 Min |
|---|---|---|---|
| FLAVOR AMOUNT | 65 | 55 | 40 |
| FLAVOR LIKING | 70 | 61.66 | 43.33 |
| SWEETS AMOUNT | 73.33 | 43.33 | 26.66 |
| SWEET LIKING | 68.33 | 50 | 38.33 |
| COOLING SENSATION | 61.66 | 50 | 46.66 |
| COOLING LIKE | 68.33 | 45 | 46.66 |
| TEXTURE | 51.66 | 46.66 | 43.33 |
| TEXTURE LIKE | 65 | 53.33 | 50 |
| OVERALL LIKING |  |  | 63.33 |

The trained panelists found the chewing gum containing Avicel flavor blend to be superior to the control gum and to the chewing gum containing encapsulated flavor in relation to "overall liking".

Example 7

A comparison of fruit flavored sugar-containing bubble gums by trained panelists was done by the procedure of Example 6. The bubble gums tested were a control (Table 10), a bubble gum containing the liquid flavor mixed with a carrier to form the flavor/carrier of the present invention (Table 11), a bubble gum containing the flavor/carrier of the present invention wherein the liquid flavor and Avicel carrier are blended together at a high speed (Table 12), and a bubble gum prepared with encapsulated flavor (Table 13). The flavor/carrier ratio in the inventive bubble gums was 75% fruit flavor and 25% Avicel. The evaluations of the panelists appear in Tables 14–17.

TABLE 10

Sugar-Containing Fruit-Flavored Bubble Gum (Control)

| Material Name | Percent | Weight |
|---|---|---|
| Sugar Bubble Gum Neutral Mass | 98.99 | 643.43 |
| Liquid Fruit Flavor | 0.69 | 4.48 |
| Color Solution | 0.32 | 2.08 |
| TOTAL | 100.00 | 649.99 |

Bubble Gum Containing Fruit Flavor/Carrier (Inventive)

| Material Name | Percent | Weight |
|---|---|---|
| Sugar Bubble Gum Neutral Mass | 98.56 | 640.64 |
| Fruit Flavor/Carrier Blend | 0.92 | 5.98 |
| Color Solution | 0.32 | 2.08 |
| Encapsulated Ace-K | 0.20 | 1.30 |
| TOTAL | 100.00 | 650.00 |

TABLE 12

Bubble Gum Containing Fruit Flavor/Carrier Blended at a High Speed (Inventive)

| Material Name | Percent | Weight |
|---|---|---|
| Sugar Bubble Gum Neutral Mass | 98.56 | 640.64 |
| Fruit Flavor/Carrier Blend | 0.92 | 5.98 |
| Color Solution | 0.32 | 2.08 |
| Encapsulated Ace-K | 0.20 | 1.30 |
| Total | 100.00 | 650.00 |

TABLE 13

Bubble Gum Containing Encapsulated Fruit Flavor (Comparative)

| Material | Percent | Weight |
|---|---|---|
| Sugar Bubble Gum Neutral Mass | 94.08 | 611.52 |
| Liquid Fruit Flavor | 0.60 | 3.90 |
| Color Solution | 0.32 | 2.08 |
| Encapsulated Fruit Matrix | 5.00 | 32.50 |
| TOTAL | 100.00 | 650.00 |

TABLE 14

Sugar Fruit-Flavored Bubble Gum (Control)

|  | 2 Min | 10 Min | 20 Min |
|---|---|---|---|
| FLAVOR AMOUNT | 56.66 | 26.66 | 13.33 |
| FLAVOR LIKING | 28.33 | 28.33 | 16.66 |
| SWEETS AMOUNT | 65 | 18.33 | 15 |
| SWEET LIKING | 53.33 | 28.33 | 25 |
| COOLING SENSATION | 10 | 6.66 | 6.66 |
| COOLING LIKE | 20 | 16.66 | 16.66 |
| TEXTURE | 31.66 | 41.66 | 48.33 |
| TEXTURE LIKE | 55 | 63.33 | 63.33 |
| OVERALL LIKING |  |  | 40 |

TABLE 15

Sugar Bubble Gum Containing Fruit Flavor/Carrier (Inventive)

|  | 2 Min | 10 Min | 20 Min |
|---|---|---|---|
| FLAVOR AMOUNT | 63.33 | 35 | 28.33 |
| FLAVOR LIKING | 58.33 | 45 | 36.66 |
| SWEETS AMOUNT | 70 | 31.66 | 20 |
| SWEET LIKING | 46.66 | 40 | 30 |
| COOLING SENSATION | 20 | 10 | 8.33 |
| COOLING LIKE | 30 | 25 | 18.33 |
| TEXTURE | 21.66 | 41.66 | 46.66 |
| TEXTURE LIKE | 40 | 61.66 | 65 |
| OVERALL LIKING |  |  | 53.33333 |

TABLE 16

Sugar Bubble Gum Containing Fruit Flavor/Avicel Blended at a High Speed (Inventive)

|  | 2 Min | 10 Min | 20 Min |
|---|---|---|---|
| FLAVOR AMOUNT | 66.66 | 40 | 28.33 |
| FLAVOR LIKING | 70 | 48.33 | 33.33 |
| SWEETS AMOUNT | 71.66 | 30 | 18.33 |
| SWEET LIKING | 60 | 43.33 | 30 |
| COOLING SENSATION | 21.66 | 6.66 | 5 |
| COOLING LIKE | 31.66 | 21.66 | 15 |
| TEXTURE | 30 | 46.66 | 51.66 |
| TEXTURE LIKE | 53.33 | 66.66 | 66.66 |
| OVERALL LIKING |  |  |  |

TABLE 17

Sugar Bubble Gum Containing Encapsulated Fruit Flavor (Comparative)

|  | 2 Min | 10 Min | 20 Min |
|---|---|---|---|
| FLAVOR AMOUNT | 61.66 | 51.66 | 41.66 |
| FLAVOR LIKING | 60 | 51.66 | 46.66 |
| SWEETS AMOUNT | 60 | 38.33 | 31.66 |
| SWEET LIKING | 48.33 | 43.33 | 40 |
| COOLING SENSATION | 8.33 | 5 | 5 |
| COOLING LIKE | 16.66 | 15 | 15 |
| TEXTURE | 38.33 | 43.33 | 50 |
| TEXTURE LIKE | 38.33 | 58.33 | 60 |
| OVERALL LIKING |  |  | 58.33333 |

The results of the tests in Tables 14–17 show that trained panelists found the gum containing the inventive additive carrier blend to have flavor and sweetness extension superior to that of the control.

We claim:

1. A comestible product, having extended release of an additive, comprising an additive/carrier blend;
   the additive/carrier blend comprising a blend of a carrier and a solution comprising the additive, wherein the carrier is a colloidal gel comprising a microcrystalline material and a dispersant;
   wherein from about 10 wt. % to about 90 wt. % of the carrier is comprised of the microcrystalline material, the carrier having a particle size ranging from about 0.1 $\mu$m to about 2 $\mu$m and being capable of absorbing at least 35% of its weight of an oil- or water-based solution; and
   wherein the additive is chosen from the group consisting of flavors, sweeteners, vitamins, minerals, acids, and mixtures thereof.

2. The comestible product of claim 1 wherein the carrier contains from about 20 wt. % to about 90 wt. % microcrystalline material.

3. The comestible product of claim 1 wherein the additive is chosen from the group consisting of flavors, sweeteners, and mixtures thereof.

4. The comestible product of claim 1 wherein the carrier comprises a material chosen from the group consisting of microcrystalline cellulose, zeolites, aluminum silicates, carbon black, and mixtures thereof.

5. The comestible product of claim 4 wherein the carrier comprises microcrystalline cellulose.

6. The comestible product of claim 5 wherein the disperant is carboxymethylcellulose.

7. The comestible product of claim 5 wherein the the carrier comprises from about 20 wt. % to about 90 wt. % microcyrstalline cellulose.

8. The comestible product of claim 7 wherein the carrier comprises from about 60 wt. % to about 90 wt. % microcrystalline cellulose.

9. The comestible product of claim 5 wherein the carrier comprises from about 60 wt. % to about 90 wt. % microcrystalline cellulose, and wherein 70% of the microcrystalline cellulose particles are less that 0.2 $\mu$m.

10. The comestible product of claim 1 wherein the comestible product is chosen from the group consisting of chewing gum and bubble gum.

11. The comestible product of claim 10 wherein the comestible product further comprises a gum base.

12. The comestible product of claim 11 wherein the carrier comprises from about 20 wt. % to about 90 wt. % microcrystalline material.

13. The comestible product of claim 12 wherein the carrier comprises from about 60 wt. % to about 90 wt. % microcrystalline material.

14. The comestible product of claim 11 wherein the carrier comprises microcrystalline cellulose.

15. The comestible product of claim 14 wherein the dispersant is carboxymethylcellulose.

16. The comestible product of claim 14 wherein the carrier comprises from about 20 wt. % to about 90 wt. % microcrystalline cellulose.

17. The comestible product of claim 16 wherein the carrier comprises from about 60 wt. % to about 90 wt. % microcrystalline cellulose.

18. The comestible product of claim 14 wherein the carrier comprises from about 60 wt.% to about 90 wt.% microcrystalline cellulose, and wherein 70% of the microcrystalline cellulose particles are less that 0.2 $\mu$m.

19. The comestible product of claim 18 wherein the additive is a flavor or a sweetener.

20. The comestible product of claim 19 wherein the flavor is spearmint or peppermint.

21. The comestible product of claim 11 wherein the additive is chosen from the group consisting of flavors, sweeteners, and mixtures thereof.

22. The comestible product of claim 21 wherein the flavor is chosen from the group consisting of essential oils, fruit flavors, bean-derived flavors, wine-derived flavors, pungent materials, and mixtures thereof.

23. The comestible product of claim 21 wherein the flavor is chosen from the group consisting of cinnamon, spearmint, peppermint, birch, anise, apple, pear, peach, strawberry, cherry, apricot, orange, watermelon, banana, coffee, cocoa, curacao zin, affinin, pepper, and mustard, and mixtures thereof.

24. The comestible product of claim 23 wherein the flavor is spearmint or peppermint.

25. The comestible product of claim 21 wherein the sweetener is chosen from the group consisting of sucrose, fructose, dextrose, lactose, maltitol, sorbitol, mannitol, xylitol, lactitol, acesulfame potassium, L-aspartyl-L-phenylalanine methyl ester, talin, sucralose, alitame, monoammoniated glycerizinate, saccharin, cyclamates, cyclodextrins, D-tagatose, and mixtures thereof.

26. The comestible product of claim 25 wherein the sweetener is acesulfame potassium.

27. A comestible product, having extended release of an additive, comprising an additive/carrier blend;
   wherein the additive/carrier blend is prepared by a process comprising mixing a carrier with a solution comprising the additive and, optionally, a solvent; wherein the carrier is a colloidal gel comprising a microcrystalline material and a dispersant;

wherein from about 10 wt. % to about 90 wt. % of the carrier is comprised of the microcrystalline material, the carrier having a particle size ranging from about 0.1 μm to about 2 μm and being capable of absorbing at least 35% of its weight of an oil- or water-based solution, and wherein the additive is chosen from the group consisting of flavors, sweeteners, vitamins, minerals, acids, and mixtures thereof.

28. The comestible product of claim 27 wherein the comestible product is chosen from the group consisting of chewing gum, bubble gum, instant beverages, and frozen desserts.

29. The comestible product of claim 28 wherein the comestible product is chewing gum or bubble gum and further comprises a gum base.

30. The comestible product of claim 29 wherein the carrier comprises from about 20 wt. % to about 90 wt. % microcrystalline material.

31. The comestible product of claim 30 wherein the carrier comprises from about 60 wt. % to about 90 wt. % microcrystalline material.

32. The comestible product of claim 29 wherein the carrier comprises microcrystalline cellulose.

33. The comestible product of claim 32 wherein the dispersant is carboxymethylcellulose.

34. The comestible product of claim 32 wherein the carrier comprises from about 20 wt. % to about 90 wt. % microcrystalline cellulose.

35. The comestible product of claim 34 wherein the carrier comprises from about 60 wt. % to about 90 wt. % microcrystalline cellulose.

36. The comestible product of claim 32 wherein the carrier comprises from about 60 wt. % to about 90 wt. % microcrystalline cellulose, and wherein 70% of the microcrystalline cellulose particles are less that 0.2 μm.

37. The comestible product of claim 36 wherein the additive is a flavor or a sweetener.

38. The comestible product of claim 37 wherein the flavor is spearmint or peppermint.

39. The comestible product of claim 29 wherein the additive is chosen from the group consisting of flavors, sweeteners, and mixtures thereof.

40. The comestible product of claim 27 wherein the additive/carrier blend has the consistency of a paste.

41. The comestible product of claim 27 wherein the carrier comprises a material chosen from the group consisting of microcrystalline cellulose, zeolites, aluminum silicates, carbon black, and mixtures thereof.

42. The comestible product of claim 41 wherein the carrier comprises microcrystalline cellulose.

43. The comestible product of claim 42 wherein the despersant is carboxymethylcellulose.

44. The comestible product of claim 42 wherein the carrier comprises from about 60 wt. % to about 90 wt. % microcrystalline cellulose, and wherein 70% of the microcrystalline cellulose particles are less that 0.2 μm.

45. A method of extending the release of an additive from a comestible product, comprising adding an additive/carrier blend to a comestible product;

wherein the additive/carrier blend is prepared by a process comprising mixing a carrier with a solution comprising the additive and, optionally, a solvent; wherein the carrier is a colloidal gel comprising a microcrystalline material and a dispersant;

wherein from about 10 wt. % to about 90 wt. % of the carrier is comprised of the microcrystalline material, the carrier having a particle size ranging from about 0.1 μm to about 2 μm and being capable of absorbing at least 35% of its weight of an oil- or water-based solution; and wherein the additive is chosen from the group consisting of flavors, sweeteners, vitamins, minerals, acids, and mixtures thereof.

46. The method of claim 45 wherein the additive/carrier blend has the consistency of a paste.

47. The method of claim 45 wherein the carrier contains from about 20 wt. % to about 90 wt. % microcrystalline material.

48. The method of claim 45 wherein the comestible product is chosen from the group consisting of chewing gum, bubble gum, instant beverages, and frozen desserts.

49. The method of claim 48 wherein the comestible product is chewing gum or bubble gum and further comprises a gum base.

50. The method of claim 49 wherein the carrier comprises from about 20 wt. % to about 90 wt. % microcrystalline material.

51. The method of claim 50 wherein the carrier comprises from about 60 wt. % to about 90 wt. % microcrystalline material.

52. The method of claim 49 wherein the carrier comprises microcrystalline cellulose.

53. The method of claim 52 wherein the dispersant is carboxymethylcellulose.

54. The method of claim 52 wherein the carrier comprises from about 20 wt. % to about 90 wt. % microcrystalline celulose.

55. The method of claim 54 wherein the carrier comprises from about 60 wt. % to about 90 wt. % microcrystalline cellulose.

56. The method of claim 52 wherein the carrier comprises from about 60 wt. % to about 90 wt. % microcrystalline cellulose, and wherein 70% of the microcrystalline cellulose particles are less that 0.2 μm.

57. The method of claim 56 wherein the additive is a flavor or a sweetener.

58. The method of claim 57 wherein the flavor is spearmint or peppermint.

59. The method of claim 49 wherein the additive is chosen from the group consisting of flavors, sweeteners, and mixtures thereof.

60. The method of claim 59 wherein the flavor is chosen from the group consisting of essential oils, fruit flavors, bean-derived flavors, wine-derived flavors, pungent materials, and mixtures thereof.

61. The method of claim 59 wherein the flavor is chosen from the group consisting of cinnamon, spearmint, peppermint, birch, anise, apple, pear, peach, strawberry, cherry, apricot, orange, watermelon, banana, coffee, cocoa, curacao zin, affinin, pepper, and mustard, and mixtures thereof.

62. The method of claim 61 wherein the flavor is spearmint or peppermint.

63. The method of claim 59 wherein the sweetener is chosen from the group consisting of sucrose, fructose, dextrose, lactose, maltitol, sorbitol, mannitol, xylitol, lactitol, acesulfame potassium, L-aspartyl-L-phenylalanine methyl ester, talin, sucralose, alitame, monoammoniated glycerizinate, saccharin, cyclamates, cyclodextrins, D-tagatose, and mixtures thereof.

64. The method of claim 63 wherein the sweetener is acesulfame potassium.

65. The method of claim 45 wherein the additive is chosen from the group consisting of flavors, sweeteners, and mixtures thereof.

66. The method of claim 45 wherein the carrier comprises a material chosen from the group consisting of microcrystalline cellulose, zeolites, aluminum silicates, carbon black, and mixtures thereof.

67. The method of claim 66 wherein the carrier comprises microcrystalline cellulose.

68. The method of claim 67 wherein the dispersant is carboxymethylcellulose.

69. The method of claim 67 wherein the carrier comprises from about 20 wt. % to about 90 wt. % microcrystalline cellulose.

70. The method of claim 69 wherein the carrier comprises from about 60 wt. % to about 90 wt. % microcrystalline cellulose.

71. The method of claim 66 wherein the carrier comprises from about 60 wt. % to about 90 wt. % microcrystalline cellulose, and wherein 70% of the microcrystalline cellulose particles are less that 0.2 µm.

* * * * *